United States Patent
Lethellier (10) Patent No.: US 6,472,852 B1
(45) Date of Patent: Oct. 29, 2002

(54) RESONANT BUCK-TYPE VOLTAGE CONVERTER USING SWINGING INDUCTANCE

(75) Inventor: Patrice Lethellier, Oxnard, CA (US)

(73) Assignee: Semtech Corporation, Newbury Park, CA (US)

( * ) Notice: Subject to any disclaimer, the term of this patent is extended or adjusted under 35 U.S.C. 154(b) by 30 days.

(21) Appl. No.: 09/705,342

(22) Filed: Nov. 2, 2000

(51) Int. Cl.$^7$ .............................. G05F 1/24; G05F 1/656
(52) U.S. Cl. ........................ 323/259; 323/261; 323/232; 363/56.01
(58) Field of Search ................................ 363/50, 56.01, 363/55; 323/259, 261, 222, 232, 223

(56) References Cited

U.S. PATENT DOCUMENTS

| | | | | |
|---|---|---|---|---|
| 3,605,003 A | * | 9/1971 | Guggi | 363/139 |
| 4,829,232 A | * | 5/1989 | Erickson, Jr. | 323/290 |
| 5,402,329 A | * | 3/1995 | Wittenbreder, Jr. | 363/16 |
| 5,633,579 A | * | 5/1997 | Kim | 323/222 |
| 5,636,114 A | * | 6/1997 | Bhagwat et al. | 363/56 |
| 5,668,466 A | | 9/1997 | Vinciarelli et al. | 323/282 |
| 5,754,413 A | * | 5/1998 | Fraidlin et al. | 363/16 |
| 5,815,386 A | * | 9/1998 | Gordon | 363/50 |

* cited by examiner

Primary Examiner—Bao Q. Vu
(74) Attorney, Agent, or Firm—Thelen Reid & Priest LLP; David B. Ritchie (57) ABSTRACT

A swinging inductor is used to achieve zero-current switching in a resonant buck-type voltage converter. The swinging inductor exhibits the property of a relatively high inductance at zero current and low current, but it swings back to the original resonant inductance value at high current. In this way the high and medium regions of the current sine wave remain effectively unchanged. Upon circuit power application, the current rises slowly due to the high swinging inductance value, but this is an innocuous parasitic effect. Using the swinging inductance placed in series with a switching device to control the transfer of energy from the input source to the output load allows for a very efficient transfer of energy and it also prevents the current from becoming negative. Moreover, the efficiency level is sustainable over a wide range of input and output voltage requirements.

40 Claims, 7 Drawing Sheets

RESONANT BUCK-TYPE VOLTAGE CONVERTER USING SWINGING INDUCTANCE

FIELD OF THE INVENTION

This invention relates to a resonant buck-type voltage converter which employs a swinging inductance to achieve zero-current switching.

BACKGROUND OF THE INVENTION

Figure 1A:
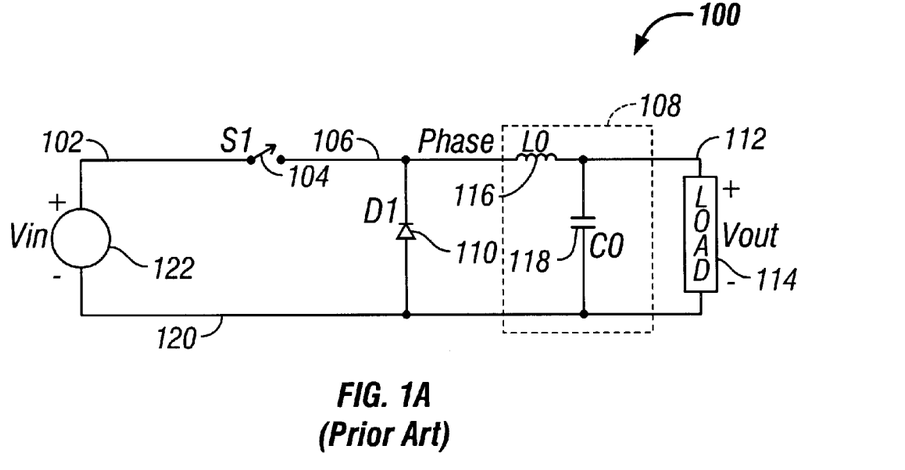
FIG. 1A is a schematic diagram illustrative of a prior art basic buck-type converter.

A basic buck-type converter configuration is shown in FIG. 1A and is designated by the general reference character 100. The input source 122 is the primary supply with its positive terminal connected to node 102 and its negative terminal connected to the common ground reference node 120. Switch 104 is connected between node 102 and Phase node 106. The anode of diode 110 is connected to the common ground node 120 and its cathode is connected to Phase node 106. Output filter 108 is comprised of inductor 116 and capacitor 118. The output filter 108 input node is the inductor 116 first terminal and it also is connected to Phase node 106. The output filter 108 output node is connected to the buck converter 100 output terminal 112 and also to the first terminal of capacitor 118 and to the second terminal of inductor 116. The second terminal of capacitor 118 is connected to the common ground node 120. The load circuit 114 is connected between the output terminal 112 and the common ground node 120. Note that, for consistency and clarity, the same identification numbers are generally used throughout this description where the same elements are used in different embodiments.

Figure 1B:
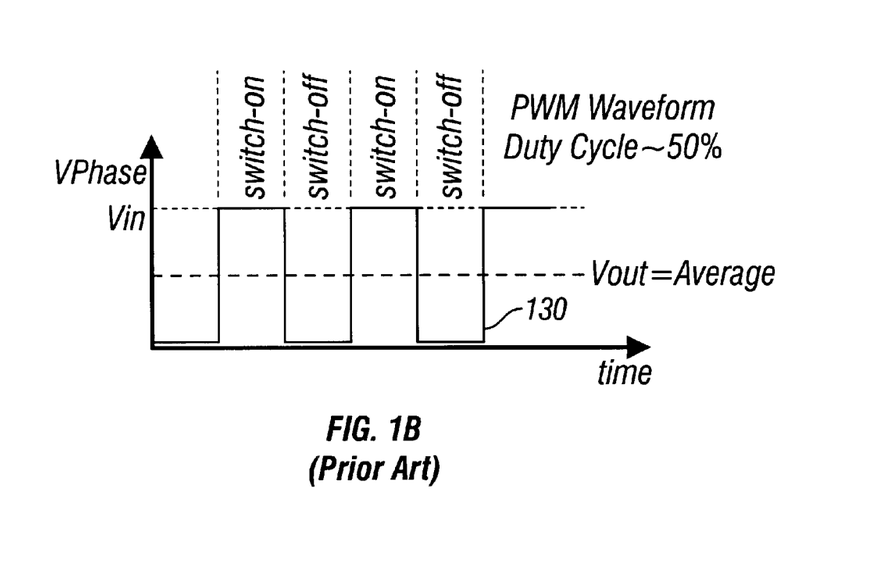
FIG. 1B is a timing diagram illustrative of the characteristics of the prior art basic buck-type converter of FIG. 1A.

The basic buck-type converter operates to transfer energy from the input source 122 to the output load 114 based on the state of switch 104. FIG. 1B shows the basic operation of the converter configuration of FIG. 1A with the voltage at the Phase node, VPhase, shown as waveform 130. When switch 104 is closed, i.e., in the on-state, VPhase is equal to Vin as energy is drawn from input source 122. When switch 104 is open, i.e., in the off-state, the current draw from the input source 122 is stopped, but the load 114 may continue to draw current from the Phase node 106 through the output filter 108 and the diode 110. This is shown in FIG. 1B as the high-to-low portion of waveform 130. The output voltage, Vout, is the average value, as indicated.

The switch 104 on-state time versus its off-state time is controlled by a Pulse Width Modulation (PWM) circuit that is not shown in FIG. 1A, but is common and well known in the art. The duty cycle of the PWM waveform, as shown and indicated in FIG. 1B, is close to 50%. This duty cycle is actually a function of the ratio of the output voltage, Vout, versus the input voltage, Vin. Where this ratio is relatively high, indicating that Vout is relatively close to Vin, the PWM waveform must have a relatively high duty cycle so that the switch 104 on-state time is greater than its off-state time. This allows more time for energy transfer from the input source. Where this ratio is relatively low, indicating that Vout is much less than Vin, the PWM waveform must have a relatively low duty cycle so that the switch 104 on-state time is much less than its off-state time. In this case, commutation losses can become significant—up to about 30% of the power flowing through the converter. Next generation microprocessors and highly integrated circuitry will operate at 1.3 volts or less and at currents of 45 amperes or more. In order to avoid having these extremely large currents on the backplanes of computer systems, primary power supply voltages will be larger than 1.3 volts, such as 5 volts or 12 volts, or possibly more in the future. Thus, the application trends are to supply lower output voltages from higher primary supplies, further exacerbating this potential commutation loss problem.

The commutation losses at such relatively high voltages lead to relatively large losses in electrical efficiency. Designers, at the same time, want to be able to operate the voltage converters at higher frequencies, e.g., 1 or 2 megahertz or more instead of 200 or 300 KHz as is presently the case. Increasing the number of commutations taking place within a given period of time like this will inevitably lead to higher losses. The desire, therefore, is to eliminate the commutation losses. This can be done by using resonant techniques to force the commutation to occur at a zero current point. With this realized, the efficiency can be raised to the 90% level, resulting in roughly ⅓ of the previous losses. Consequently, less power is thermally lost and the physical size of the voltage converter can therefore be made smaller. The voltage converters can then operate at higher frequencies without any thermal loss/efficiency penalty.

Figure 2A:
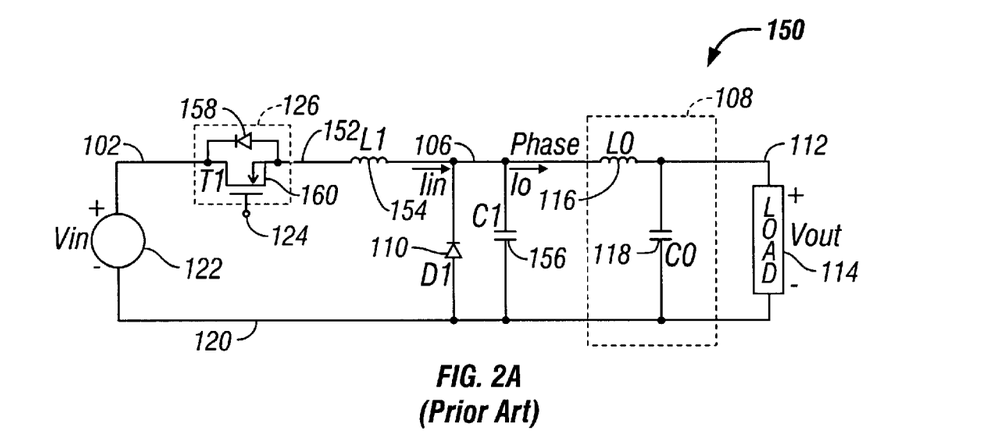
FIG. 2A is a schematic diagram illustrative of a prior art buck-type converter.
Figure 3A:
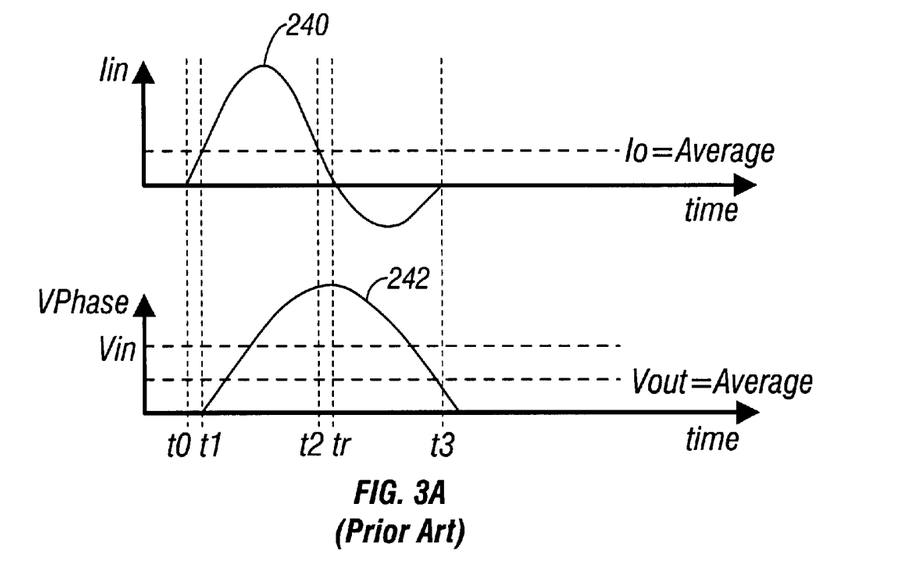
FIG. 3A is a timing diagram illustrative of the characteristics of the prior art buck-type converter of FIG. 2A.

FIG. 2A shows a schematic diagram of a buck-type converter designated by the general reference character 150 and intended to take advantage of the resonant techniques discussed above. It is a modification of the circuit shown in FIG. 1A and the differences will be discussed herein. A resonant capacitor 156 is added with its first terminal connected to Phase node 106 and its second terminal connected to the common ground node 120. This capacitor provides a relatively soft dv/dt on Phase node 106. Switching element 126 is shown in its more common actual implementation as an n-channel MOS transistor device (NMOS). Any switching element could be used here, such as other types of transistors, including bipolar devices or isolated gate bipolar transistors (IGBTs). The switch 126 includes transistor 160 and parasitic diode 158. The transistor 160 source terminal is connected to node 152, its drain terminal is connected to node 102 and its gate terminal is connected to node 124. Node 124 receives the output of the PWM switch control circuit that is not shown, but is described above. In a series connection with transistor 160, the first terminal of inductor 154 is connected to node 152 and its second terminal is connected to Phase node 106. The inductance 154 may, with equal effect, be located on the other side of switch 126, i.e., between node 102 and switch 126. While the goal of this circuit is to switch at zero current to minimize the associated commutation losses, the current actually rings back to negative values and charge is sent back to the input source. The waveforms illustrating only one cycle of the cyclical operation of the circuit of FIG. 2A are shown in FIG. 3A. In FIG. 3A, waveform 240 shows the Iin current and the waveform is mapped through time point designations t0, tr, and t1 to the waveform 242 that shows the VPhase voltage. The switch-on time is from t0 through t1 and tr represents the resonant time point.

Figure 2B:
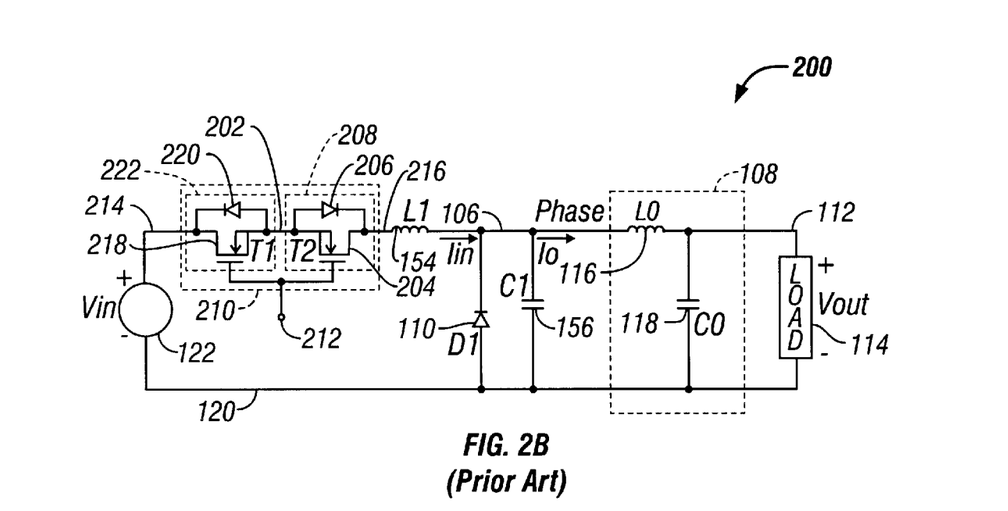
FIG. 2B is a schematic diagram illustrative of prior art modified buck-type converter.
Figure 3B:
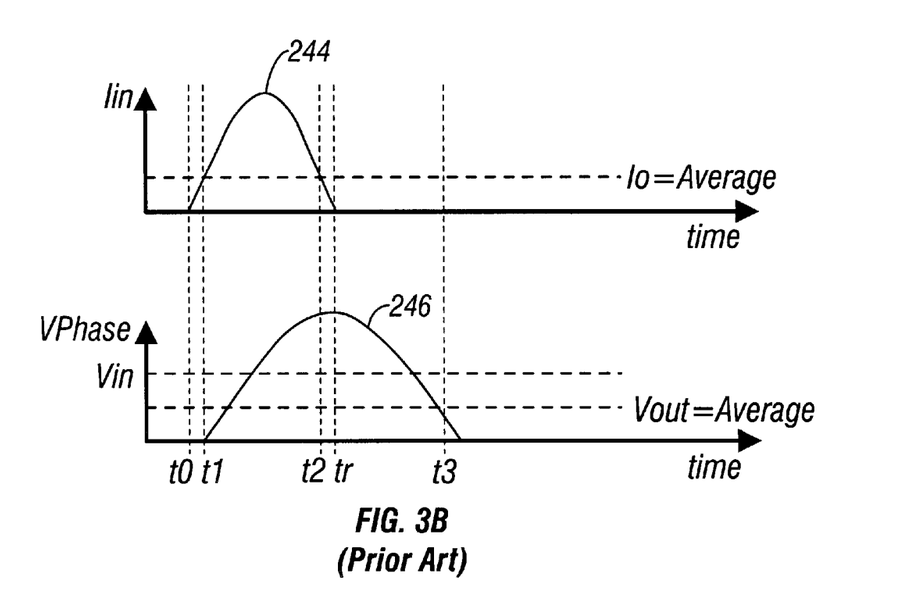
FIG. 3B is a timing diagram illustrative of the characteristics of the prior art modified buck-type converter of FIG. 2B.

One way to block the negative part of the current waveform shown in FIG. 3A is to add a diode or a second transistor back-to-back with the switch transistor accepting the PWM signal of the circuit of FIG. 2A. FIG. 2B shows a schematic diagram of a buck-type converter designated by the general reference character 200 where block 210 effectively replaces switch 126 of FIG. 2A. In block 210, the switch 222 includes transistor 218 and parasitic diode 220. The transistor 218 source terminal is connected to node 202, its drain terminal is connected to node 214, which is also the positive terminal connection for input source 122, and its gate terminal is connected to node 212. Node 212 accepts the PWM signal for energy transfer control, as discussed above. The second element in block 210, sub-block 208, primarily performs a diode function to disallow negative current flow, but includes transistor 204 as well as parasitic diode 206. Of course, any diode, one-way switching element, or appropriate transistor, such as a bipolar transistor or IGBT, could be used here instead of the NMOS transistor including a parasitic diode, as shown. The transistor 204 source terminal is connected to node 202, its drain terminal is connected to node 216, and its gate terminal is connected to node 212 to also receive the PWM signal for energy transfer control. The waveforms illustrating only one cycle of the cyclical operation of the circuit of FIG. 2B are shown in FIG. 3B. In FIG. 3B, waveform 244 shows the Iin current and this waveform is mapped through time point designations t0, tr, and t1 to the waveform 246 that shows the VPhase voltage. The switch-on time is from to through t1 and tr represents the resonant time point. As is seen from the waveform 244, the current is not allowed to go negative because of the blocking diode action.

The problem with the circuit shown in FIG. 2B is that, at low input voltage, the diode or the second NMOS device of sub-block 208 reduces the conversion efficiency. The approximately 0.6V voltage drop across the diode limits the efficiency as the input voltage is reduced. The case as illustrated in FIG. 2B, where the NMOS transistor is used, is able to efficiently operate at lower Vin values than the corresponding single diode case, but the efficiency loss problem at low input voltage remains. So, for a circuit to yield high efficiency conversion over a relatively wide range of input and output voltage requirements, another solution is required.

SUMMARY OF THE INVENTION

In this invention, a swinging inductor is used to achieve zero-current switching in a resonant buck-type voltage converter. The swinging inductor exhibits the property of a relatively high inductance at zero current and low current, but it swings back to the original resonant inductance value at high current. So, the high and medium regions of the current sine wave remain effectively unchanged. However, upon circuit power application, the current rises slowly due to the high swinging inductance value, but this is an innocuous parasitic effect.

Figure 4A:
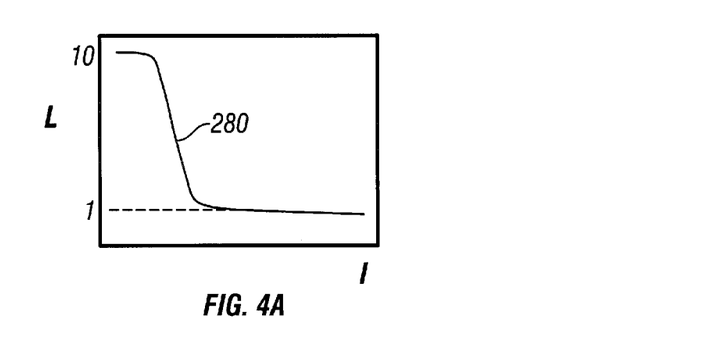
FIG. 4A is an inductance diagram illustrative of the characteristics of the swinging inductor.
Figure 4B:
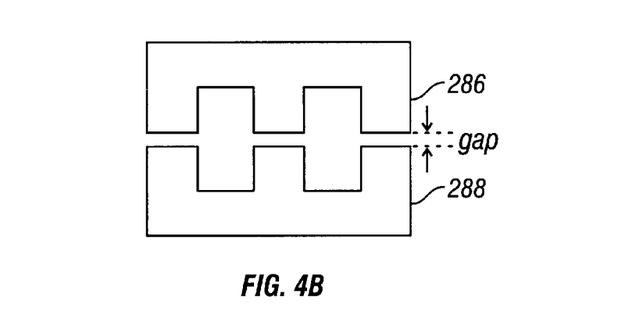
FIG. 4B is a diagram illustrative of the core structure of the swinging inductor.
Figure 4C:
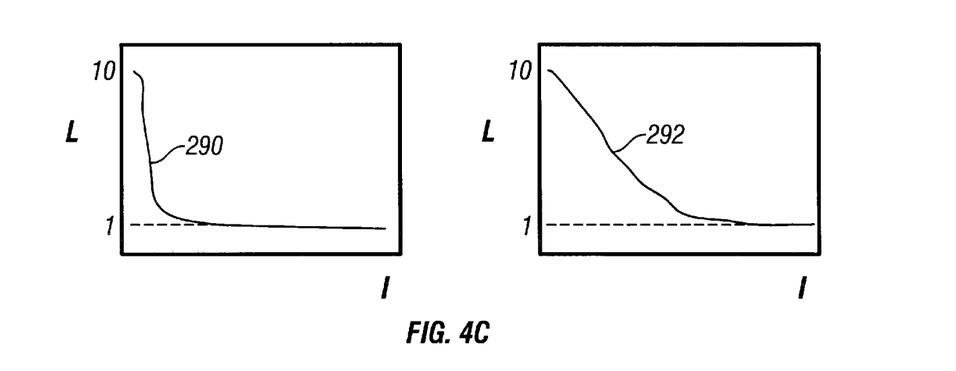
FIG. 4C is an inductance diagram comparison illustrative of different core gap settings in the construction of the swinging inductor.

FIG. 4A shows the inductance versus current waveform 280 of a typical swinging inductance. There is commonly a 10X difference in the high inductance value as compared to the resonant inductance value. FIG. 4B shows two E-cores contained in the inductor construction where the gap between E-core 286 and E-core 288 affects the inductance curve of the manufactured swinging inductor. FIG. 4C shows two waveforms that illustrate the variations due to the gap between the E-cores. Waveform 290 exemplifies a small gap whereas waveform 292 exemplifies a large gap structure. The large gap structure inductor saturates more slowly and this is why curve 292 rolls off much slower as compared to curve 290. Other types of saturable inductors function as swinging inductors, such as those doped with non-magnetic materials which serve the physical function of the gap.

Using the swinging inductance placed in series with a switching device to control the transfer of energy from the input source to the output load allows for a very efficient transfer of energy. Moreover, the efficiency level is sustainable over a wide range of input and output voltage requirements.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings.

DETAILED DESCRIPTION OF SPECIFIC EMBODIMENTS OF THE INVENTION

Several embodiments of the present invention are described herein in the context of a resonant buck-type voltage converter. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Figure 5A:
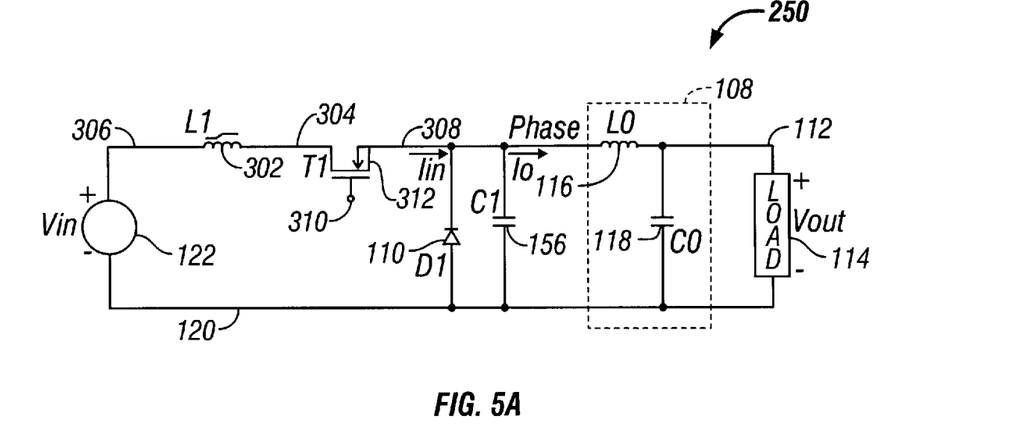
FIG. 5A is a schematic diagram illustrative of a first embodiment of the present invention.
Figure 5B:
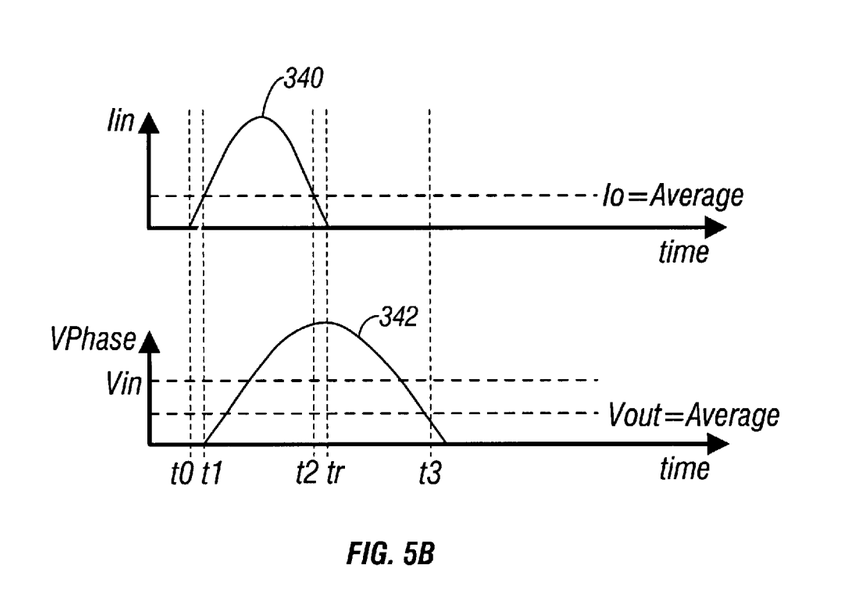
FIG. 5B is a timing diagram illustrative of the characteristics of a first embodiment of the present invention in accordance with FIG. 5A.

FIG. 5A shows a first embodiment of the present invention in the circuit indicated by the general reference character 250. Several circuit components that are common to resonant buck-type converter circuits were previously discussed, so only the different elements and arrangements will be discussed herein. The circuit includes a swinging inductor 302 with its first terminal connected to node 306, which is also connected to the positive terminal of the input supply 122, and its second terminal connected to node 304. NMOS transistor 312 acts as a switch and its source terminal is connected to Phase node 308, its drain terminal is connected to node 304, and its gate terminal is connected to node 310. Node 310 receives the PWM signal to control energy transfer from the input source 122. The parasitic diode associated with transistor 312 is not shown in this or in subsequent figures for simplicity. The order of the series devices 302 and 312 allows for a lower gate voltage on node 310 with the transistor 312 located between the swinging inductor 302 and the Phase node 308. Of course, other transistor types, such as bipolar transistors or IGBTs, could be used in place of the NMOS device 312 illustrated. FIG. 5B shows waveforms for only one cycle of the cyclical operation of the circuit of FIG. 5A. Before going negative, the high inductance value of swinging inductor 302 effectively blocks the current and gives time for capacitor 156 to transfer the energy to the output filter 108 and, thus, for V-Phase to become lower than Vin, preventing negative input current. In this way the energy is forced through the output path and it is blocked from returning to the input source. In FIG. 5B, waveform 340 shows the Iin current and the waveform is mapped through time point designations t0, t1, t2, tr, and t3 to the waveform 342 that shows the VPhase voltage. The switch-on time is from t0 through t3 and tr represents the resonant time point. As is seen from the waveform 340, the current is not allowed to go negative.

Swinging inductance devices may be made of saturable inductors, such as those having physical gaps as illustrated in FIG. 4B, as well as those doped with non-magnetic materials. Such devices are widely commercially available as, for example, from the Steward Company and the Falco Company, both of Florida.

Figure 6A:
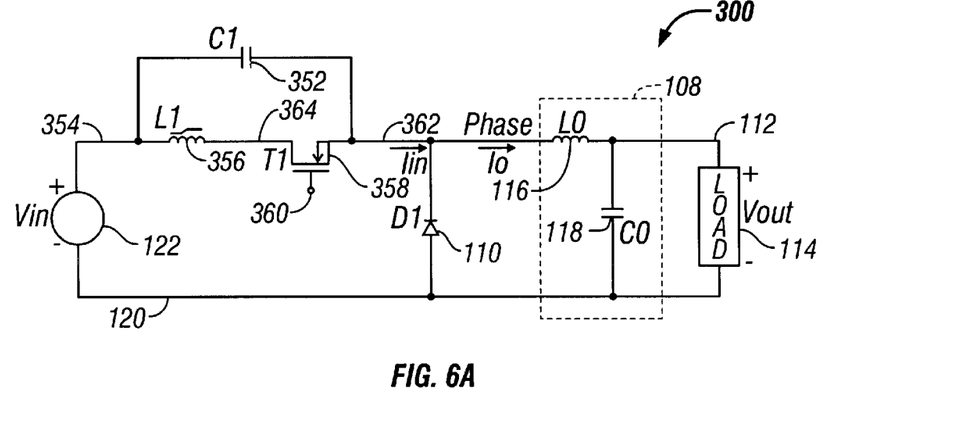
FIG. 6A is a schematic diagram illustrative of a second embodiment of the present invention.
Figure 6B:
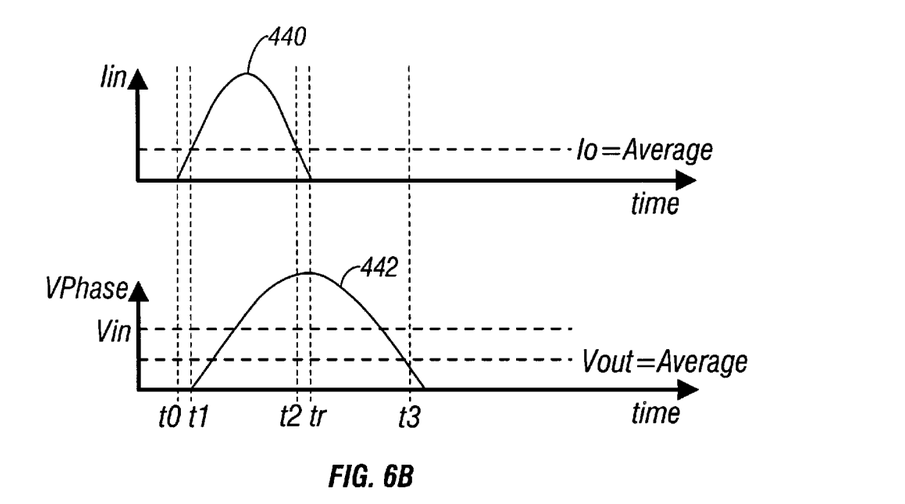
FIG. 6B is a timing diagram illustrative of the characteristics of a second embodiment of the present invention in accordance with FIG. 6A.

FIG. 6A shows a second embodiment of the present invention in the circuit indicated by the general reference character 300. Several circuit components that are common to resonant buck-type converter circuits were previously discussed, so only the different elements and arrangements will be discussed herein. The circuit includes a swinging inductor 356 with its first terminal connected to node 354, which is also connected to the positive terminal of the input supply 122, and its second terminal connected to node 364. NMOS transistor 358 acts as a switch and its source terminal is connected to Phase node 362, its drain terminal is connected to node 364, and its gate terminal is connected to node 360. Node 360 receives the PWM signal to control energy transfer from the input source 122. Of course, other transistor types, such as bipolar transistors or IGBTs, could be used in place of the NMOS device 358 illustrated. The first terminal of capacitor 352 is connected to input source 122 positive terminal node 354 and the second terminal of capacitor 352 is connected to Phase node 362. This capacitor arrangement represents the M-type resonant switch configuration, as is known in the art, and it helps to smooth out the current transients. FIG. 6B shows waveforms for only one cycle of the cyclical operation of the circuit of FIG. 6A. In FIG. 6B, waveform 440 shows the IT1 current and the waveform is mapped through time point designations t0, t1, t2, tr, and t3 to the waveform 442 that shows the VPhase voltage. The switch-on time is from t0 through t3 and tr represents the resonant time point. As is seen from the waveform 440, the current is not allowed to go negative because of the swinging inductance action.

Figure 7A:
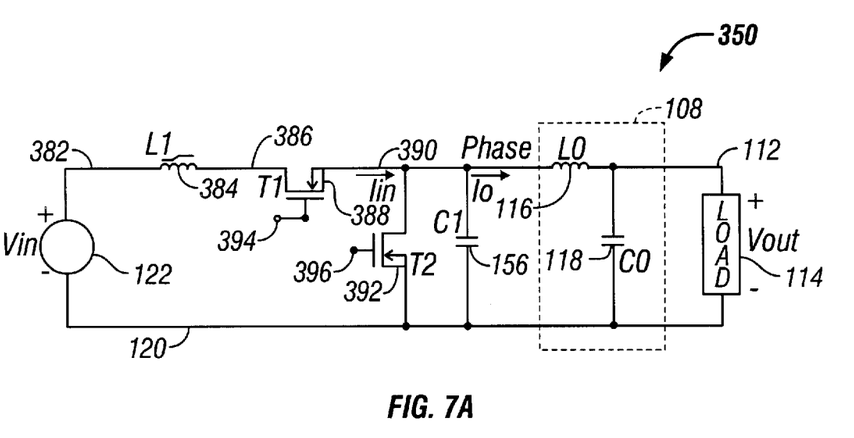
FIG. 7A is a schematic diagram illustrative of a third embodiment of the present invention.

FIG. 7A shows a third embodiment of the present invention in the circuit indicated by the general reference character 350. This circuit is the synchronous counterpart to the asynchronous circuit shown in FIG. 5A. Several circuit components that are common to resonant buck-type converter circuits were previously discussed, so only the different elements and arrangements will be discussed herein. The circuit includes a swinging inductor 384 with its first terminal connected to node 382, which is also connected to the positive terminal of input supply 122, and its second terminal connected to node 386. NMOS transistor 388 acts as a switch and its source terminal is connected to Phase node 390, its drain terminal is connected to node 386, and its gate terminal is connected to node 394. A diode in the corresponding asynchronous implementation of FIG. 5A is replaced in the synchronous counterpart circuit of FIG. 7A by NMOS transistor 392. The transistor 392 source terminal is connected to the common ground node 120, its drain terminal is connected to Phase node 390, and its gate terminal is connected to node 396. Node 394 receives a first PWM signal and node 396 receives a second PWM signal, which drives transistor 392 during the corresponding time period that diode 110 of FIG. 5A conducts. The second PWM signal applied to node 396 is typically 180 degrees out of phase relative to the first PWM signal applied to node 394 in order to avoid cross conduction. This configuration suffers reduced losses because the voltage drop across transistor 392 in FIG. 7A is lower than the corresponding voltage drop across diode 110 of FIG. 5A. Of course, other transistor types, such as bipolar transistors or IGBTs, could be used in place of either illustrated NMOS device 388 or device 392. Before going negative, the high inductance value of swinging inductor 384 effectively blocks the current and gives time for capacitor 156 to transfer the energy to the output filter 108 and, thus, for VPhase to become lower than Vin, preventing negative input current. So, the energy is forced through the output path and it is blocked from returning to the input source.

Figure 7B:
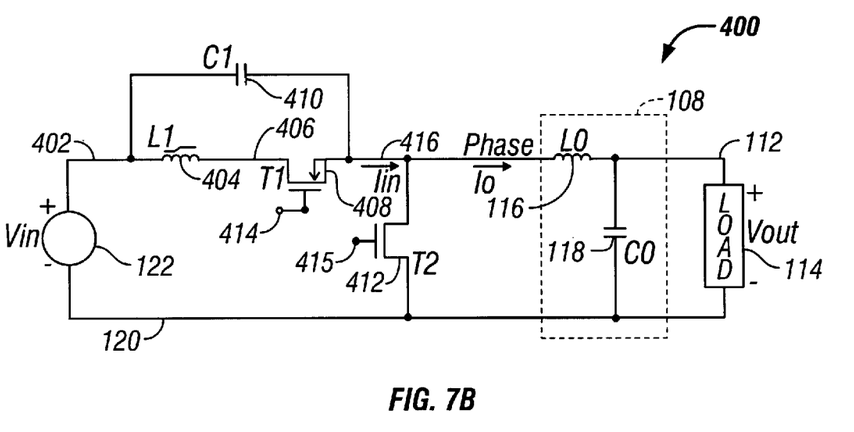
FIG. 7B is a schematic diagram illustrative of a fourth embodiment of the present invention.

FIG. 7B shows a fourth embodiment of the present invention in the circuit indicated by the general reference character 400. This circuit is the synchronous counterpart to the asynchronous circuit shown in FIG. 6A. Several circuit components that are common to resonant buck-type converter circuits were previously discussed, so only the different elements and arrangements will be discussed herein. The circuit includes a swinging inductor 404 with its first terminal connected to node 402, which is also connected to the positive terminal of input supply 122, and its second terminal connected to node 406. NMOS transistor 408 acts as a switch and its source terminal is connected to Phase node 416, its drain terminal is connected to node 406, and its gate terminal is connected to node 414. A diode in the corresponding asynchronous implementation of FIG. 6A is replaced in the synchronous counterpart circuit of FIG. 7B by NMOS transistor 412. The first terminal of capacitor 410 is connected to input source 122 positive terminal node 402 and the second terminal is connected to Phase node 416. The transistor 412 source terminal is connected to the common ground node 120, its drain terminal is connected to Phase node 416, and its gate terminal is connected to node 415. Node 414 receives a first PWM signal and node 415 receives a second PWM signal, which drives transistor 412 during the corresponding time period that diode 110 of FIG. 6A conducts. The second PWM signal applied to node 415 is typically 180 degrees out of phase relative to the first PWM signal applied to node 414 in order to avoid cross conduction. This configuration suffers reduced losses because the voltage drop across transistor 412 in FIG. 7B is lower than the corresponding voltage drop across diode 110 of FIG. 6A. Of course, other transistor types, such as bipolar transistors or IGBTs, could be used in place of either illustrated NMOS device 408 or device 412.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A resonant buck-type voltage converter circuit comprising:
   an input terminal and a reference terminal receiving a voltage therebetween;
   a swinging inductor coupled to the input terminal and to a first node;
   a switching element receiving a control signal input and coupled to the first node and to a phase node;
   a diode coupled to the phase node and to the reference terminal;
   a resonant capacitor coupled to the phase node and to the reference terminal;
   an output filter coupled to the phase node, to an output terminal, and to the reference terminal; and
   the output terminal and the reference terminal supporting a load circuit therebetween.

2. A resonant buck-type voltage converter circuit comprising:
   an input terminal and a reference terminal receiving a voltage therebetween;
   a swinging inductor coupled to the input terminal and to a first node;
   a first switching element receiving a first control signal input and coupled to the first node and to a phase node;
   a second switching element receiving a second control signal input and coupled to the phase node and to the reference terminal;
   a resonant capacitor coupled to the phase node and to the reference terminal;
   an output filter coupled to the phase node, to an output terminal, and to the reference terminal; and
   the output terminal and the reference terminal supporting a load circuit therebetween.

3. A resonant buck-type voltage converter circuit comprising:
   an input terminal and a reference terminal receiving a voltage therebetween;
   a swinging inductor coupled to the input terminal and to a first node;
   a switching element receiving a control signal input and coupled to the first node and to a phase node;
   a diode coupled to the phase node and to the reference terminal;
   a resonant capacitor coupled to the phase node and to the input terminal;
   an output filter coupled to the phase node, to an output terminal, and to the reference terminal; and
   the output terminal and the reference terminal supporting a load circuit therebetween.

4. A resonant buck-type voltage converter circuit comprising:
   an input terminal and a reference terminal receiving a voltage therebetween;
   a swinging inductor coupled to the input terminal and to a first node;
   a first switching element receiving a first control signal input and coupled to the first node and to a phase node;
   a second switching element receiving a second control signal input and coupled to the phase node and to the reference terminal;
   a resonant capacitor coupled to the phase node and to the input terminal;
   an output filter coupled to the phase node, to an output terminal, and to the reference terminal; and
   the output terminal and the reference terminal supporting a load circuit therebetween.

5. A resonant buck-type voltage converter circuit comprising:
   an input terminal and a reference terminal receiving a voltage therebetween;
   a switching element receiving a control signal input and coupled to the input terminal and to a first node;
   a swinging inductor coupled to the first node and to a phase node;
   a diode coupled to the phase node and to the reference terminal;
   a resonant capacitor coupled to the phase node and to the reference terminal;
   an output filter coupled to the phase node, to an output terminal, and to the reference terminal; and
   the output terminal and the reference terminal supporting a load circuit therebetween.

6. A resonant buck-type voltage converter circuit comprising:
   an input terminal and a reference terminal receiving a voltage therebetween;
   a first switching element receiving a first control signal input and coupled to the input terminal and to a first node;
   a swinging inductor coupled to the first node and to a phase node;
   a second switching element receiving a second control signal input and coupled to the phase node and to the reference terminal;
   a resonant capacitor coupled to the phase node and to the reference terminal;
   an output filter coupled to the phase node, to an output terminal, and to the reference terminal; and
   the output terminal and the reference terminal supporting a load circuit therebetween.

7. A resonant buck-type voltage converter circuit comprising:
   an input terminal and a reference terminal receiving a voltage therebetween;
   a switching element receiving a control signal input and coupled to the input terminal and to a first node;
   a swinging inductor coupled to the first node and to a phase node;
   a diode coupled to the phase node and to the reference terminal;

a resonant capacitor coupled to the phase node and to the input terminal;

an output filter coupled to the phase node, to an output terminal, and to the reference terminal; and the output terminal and the reference terminal supporting a load circuit therebetween.

8. A resonant buck-type voltage converter circuit comprising:

an input terminal and a reference terminal receiving a voltage therebetween;

a first switching element receiving a first control signal input and coupled to the input terminal and to a first node;

a swinging inductor coupled to the first node and to a phase node;

a second switching element receiving a second control signal input and coupled to the phase node and to the reference terminal;

a resonant capacitor coupled to the phase node and to the input terminal;

an output filter coupled to the phase node, to an output terminal, and to the reference terminal; and the output terminal and the reference terminal supporting a load circuit therebetween.

9. The circuit of claim 1, wherein said switching element is a MOS transistor device with the gate of the device coupled to receive the control signal input.

10. The circuit of claim 2, wherein said first switching element is a MOS transistor device with the gate of the device coupled to receive said first control signal input.

11. The circuit of claim 2, wherein said second switching element is a MOS transistor device with the gate of the device coupled to receive said second control signal input.

12. The circuit of claim 3, wherein said s witching element is a MOS transistor device with the gate of the device coupled to receive the control signal input.

13. The circuit of claim 4, wherein said first switching element is a MOS transistor device with the gate of the device coupled to receive said first control signal input.

14. The circuit of claim 4, wherein said second switching element is a MOS transistor device with the gate of the device coupled to receive said second control signal input.

15. The circuit of claim 5, wherein said switching element is a MOS transistor device with the gate of the device coupled to receive the control signal input.

16. The circuit of claim 6, wherein said first switching element is a MOS transistor device with the gate of the device coupled to receive said first control signal input.

17. The circuit of claim 6, wherein said second switching element is a MOS transistor device with the gate of the device coupled to receive said second control signal input.

18. The circuit of claim 7, wherein said switching element is a MOS transistor device with the gate of the device coupled to receive the control signal input.

19. The circuit of claim 8, wherein said first switching element is a MOS transistor device with the gate of the device coupled to receive said first control signal input.

20. The circuit of claim 8, wherein said second switching element is a MOS transistor device with the gate of the device coupled to receive said second control signal input.

21. The circuit of claim 1, wherein said switching element is a bipolar transistor or IGBT device with the base of the device coupled to receive the control signal input.

22. The circuit of claim 2, wherein said first switching element is a bipolar transistor or IGBT device with the base of the device coupled to receive said first control signal input.

23. The circuit of claim 2, wherein said second switching element is a bipolar transistor or IGBT device with the base of the device coupled to receive said second control signal input.

24. The circuit of claim 3, wherein said switching element is a bipolar transistor or IGBT device with the base of the device coupled to receive the control signal input.

25. The circuit of claim 4, wherein said first switching element is a bipolar transistor or IGBT device with the base of the device coupled to receive said first control signal input.

26. The circuit of claim 4, wherein said second switching element is a bipolar transistor or IGBT device with the base of the device coupled to receive said second control signal input.

27. The circuit of claim 5, wherein said switching element is a bipolar transistor or IGBT device with the base of the device coupled to receive the control signal input.

28. The circuit of claim 6, wherein said first switching element is a bipolar transistor or IGBT device with the base of the device coupled to receive said first control signal input.

29. The circuit of claim 6, wherein said second switching element is a bipolar transistor or IGBT device with the base of the device coupled to receive said second control signal input.

30. The circuit of claim 7, wherein said switching element is a bipolar transistor or IGBT device with the base of the device coupled to receive the control signal input.

31. The circuit of claim 8, wherein said first switching element is a bipolar transistor or IGBT device with the base of the device coupled to receive said first control signal input.

32. The circuit of claim 8, wherein said second switching element is a bipolar transistor or IGBT device with the base of the device coupled to receive said second control signal input.

33. The circuit of claim 1, wherein said output filter includes:

an output inductor; and an output capacitor, wherein said output inductor is a non-swinging inductor type and is coupled to said phase node and to said output terminal and said output capacitor is coupled to said output terminal and to said reference terminal.

34. The circuit of claim 2, wherein said output filter includes:

an output inductor; and an output capacitor, wherein said output inductor is a non-swinging inductor type and is coupled to said phase node and to said output terminal and said output capacitor is coupled to said output terminal and to said reference terminal.

35. The circuit of claim 3, wherein said output filter includes:

an output inductor; and an output capacitor, wherein said output inductor is a non-swinging inductor type and is coupled to said phase node and to said output terminal and said output capacitor is coupled to said output terminal and to said reference terminal.

36. The circuit of claim 4, wherein said output filter includes:

an output inductor; and an output capacitor, wherein said output inductor is a non-swinging inductor type and is coupled to said phase node and to said output terminal and said output capacitor is coupled to said output terminal and to said reference terminal.

37. The circuit of claim 5, wherein said output filter includes:

an output inductor; and an output capacitor, wherein said output inductor is a non-swinging inductor type and is coupled to said phase node and to said output terminal and said output capacitor is coupled to said output terminal and to said reference terminal.

38. The circuit of claim 6, wherein said output filter includes:

an output inductor; and an output capacitor, wherein said output inductor is a non-swinging inductor type and is coupled to said phase node and to said output terminal and said output capacitor is coupled to said output terminal and to said reference terminal.

39. The circuit of claim 7, wherein said output filter includes:

an output inductor; and an output capacitor, wherein said output inductor is a non-swinging inductor type and is coupled to said phase node and to said output terminal and said output capacitor is coupled to said output terminal and to said reference terminal.

40. The circuit of claim 8, wherein said output filter includes:

an output inductor; and an output capacitor, wherein said output inductor is a non-swinging inductor type and is coupled to said phase node and to said output terminal and said output capacitor is coupled to said output terminal and to said reference terminal.

* * * * *

UNITED STATES PATENT AND TRADEMARK OFFICE
CERTIFICATE OF CORRECTION

PATENT NO. : 6,472,852 B1
DATED : October 29, 2002
INVENTOR(S) : Patrice Lethellier It is certified that error appears in the above-identified patent and that said Letters Patent is hereby corrected as shown below:

Column 3,
Line 17, replace "to" with -- t$\emptyset$ --.

Column 9,
Line 34, please replace "s witching" with -- switching --

Signed and Sealed this

First Day of July, 2003

JAMES E. ROGAN
*Director of the United States Patent and Trademark Office*